(No Model.)    2 Sheets—Sheet 1.
T. DUNCAN.
METER FOR ALTERNATING ELECTRIC CURRENTS.
No. 560,087.    Patented May 12, 1896.
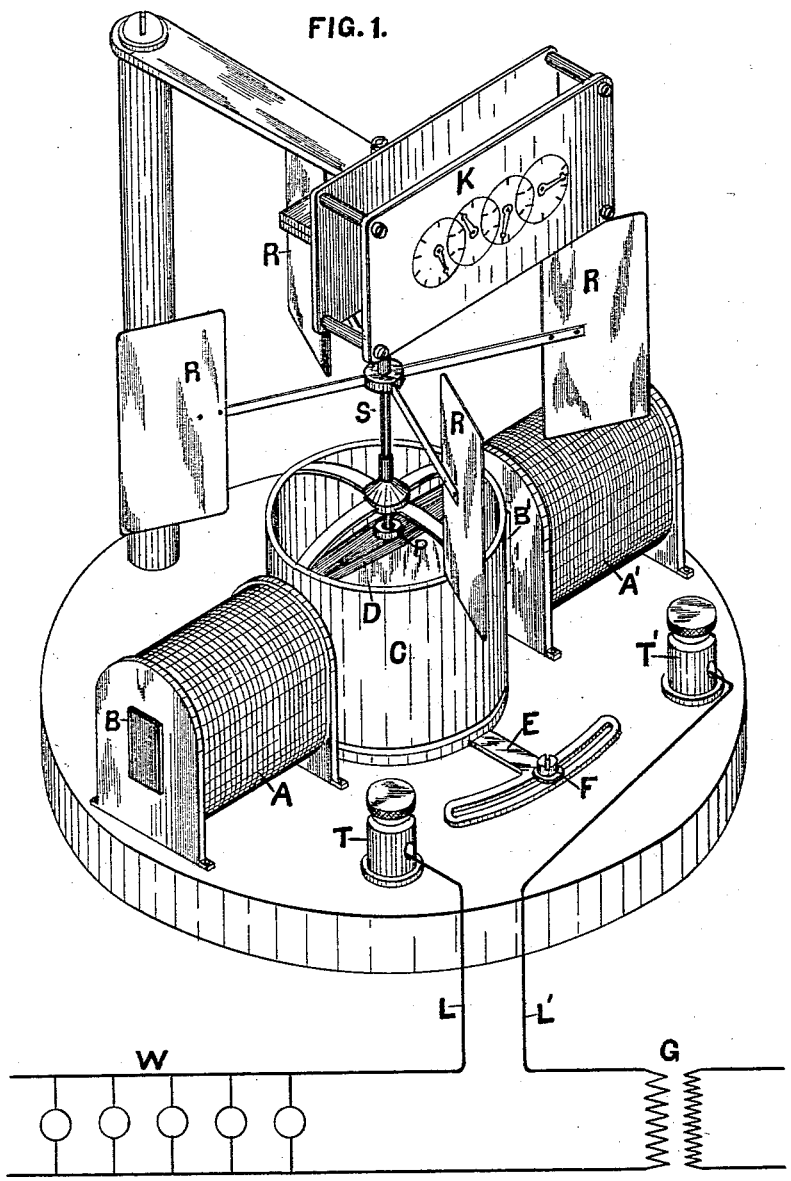
WITNESSES:
Thomas Duncan INVENTOR
BY Chapin & Denny
his ATTORNEYS.

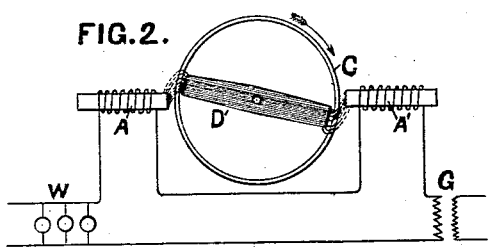
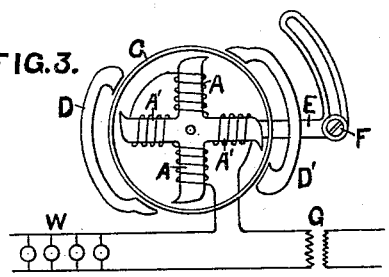
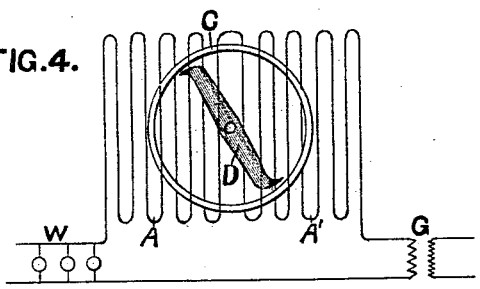
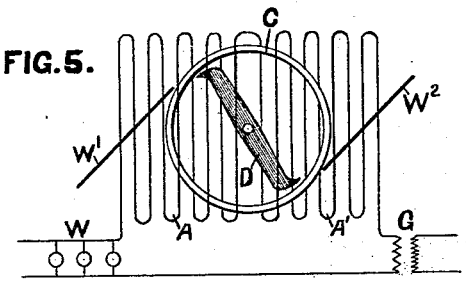
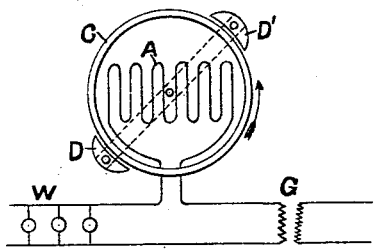
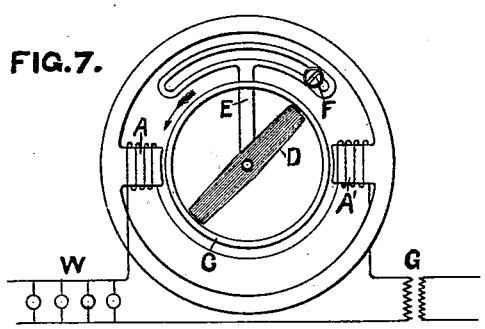
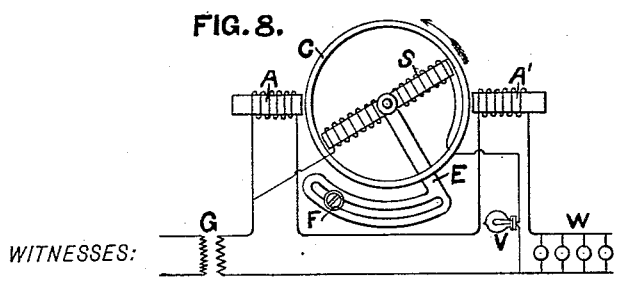

UNITED STATES PATENT OFFICE.

THOMAS DUNCAN, OF FORT WAYNE, INDIANA.

METER FOR ALTERNATING ELECTRIC CURRENTS.

SPECIFICATION forming part of Letters Patent No. 560,087, dated May 12, 1896.

Application filed December 21, 1891. Serial No. 415,825. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Meters for Alternating Electric Currents; and I do hereby declare that the following is a full, clear, and exact description of the invention, which will enable others skilled in the art to which it appertains to make and use the same, reference being had to the accompanying drawings, which form part of this specification.

My invention relates to improvements in recording electric meters.

The object of my improvement is to provide a cheap, efficient, and reliable recording-meter for measuring the energy consumed in alternating, pulsating, or intermittent electric-current circuits or portions thereof without the use of brushes, commutator, mercury, or rubbing contacts or other current rectifying or changing devices.

The principal elements employed in the construction of my improved electric meter are, first, an armature of metal capable of rotation; second, an electric circuit so arranged that when traversed by alternating, pulsating, or intermittent electric currents a field of force is induced having a given polar line or axis with reference to said armature, and, third, an adjustable magnetic path-diverter, of iron or other magnetizable metal, so arranged with reference to said field of force that secondary currents are induced in the armature in such a plane that the repulsion between them and the inducing-field will produce rotation of the armature.

In the accompanying drawings, Figure 1 is a perspective view of one form of my improved meter embodying the features above mentioned. Figs. 2, 3, 4, 5, 6, 7, and 8 illustrate modified forms of my improvement and various modes of adjusting and connecting the same in the circuit.

Similar letters refer to similar parts throughout the several views.

In Fig. 1, A and A' represent the inducing coils or fields connected in the work-circuit, through which passes the current to be measured.

B and B' are cores of laminated iron placed within the coils or inducing-fields A and A' in the usual manner.

C is a cylinder or armature, of copper or other electric conducting metal, placed within the field of force between the energizing-coils A and A' and so adjusted on the shaft S that it is free to rotate on the jewel P.

D is a magnetic path-diverter constructed of soft iron or thin sheets of the same or other magnetizable metal and so adjusted on a pivot or center within the cylinder or armature C that it can be adjusted to any desired angle by means of the jewel-arm E, which is secured to the bottom of said diverter D.

F is a set-screw provided for securing the lever-arm E when the necessary torque or speed is obtained.

K is the registering or recording device, of well-known construction, which is connected to the shaft S by the worm N upon said shaft and the wheel M, with which it is geared.

R is a winged fan or retarding device, of aluminium or other suitable material, which is adjusted in a proper manner upon the shaft S and is designed to regulate the speed of the armature C in a manner well understood, the binding-posts T and T' connecting the meter in the lamp or work circuit W and with the generator G by means of the wires L and L'.

The mode of operation of my improved recording electric meter above described is as follows: The armature C occupies the relation of a secondary of low resistance toward the primary coils A and A' and is repelled from them. If the path-diverter D were absent and the axes of the coils A and A' were in line with the center of the armature, no rotation would take place, because the repelling forces would be equal and opposite. The same result follows if the magnetic path-diverter is placed with its axis in line with the axes of the primary coils, those being in line with the center of the armature; but the shifting of the path-diverter out of line with the axes of the coils, as shown diagrammatically in Fig. 2, distorts the lines of force, so that they cut the armature obliquely and give the repelling force of the primary coils A and A' a tangential component which causes rotation of the armature. The torque or turning movement of the armature increases from zero when the path-diverter is in line with the axes of the coils A and A' to a maximum when it is at an angle of about forty-five degrees with that line. Obviously reversing the angular position of the diverter reverses the direction of the rotation of the armature.

In Figs. 3, 4, 5, 6, 7, and 8 are modifications of the principle of my invention.

The primary coils may be placed inside the armature, as shown in Fig. 3, with path-diverters D and D' outside the armature.

The iron cores may be omitted from the primary coils, as in Fig. 4.

Small strips of iron may be set in the coils tangentially to the armature, as seen in Fig. 5, to give direction and concentration to the lines of force.

A primary coil without a core may be placed inside the armature with an adjustable path-diverter outside, as shown in Fig. 6.

The free ends of the cores of the primary coils may be joined so as to form a magnetic circle, as seen in Fig. 7.

Fig. 8 shows an application of the same principle in such a manner that a meter so constructed is capable of measuring the total amount of electrical energy or work used or consumed in a circuit or division thereof in a given time.

The fine-wire coil or winding S is connected in shunt across the terminals of the circuit or mains whose potential or pressure forms part of the energy to be measured.

In series with the main circuit is placed the thick wire coils A A', so that all the current passes through them. It is at once evident then that as long as no current passes or flows through the coils A and A' no rotation of the cylinder will take place. Although the fine wire coil S is energized, it of itself or by its own action cannot produce rotation, for reasons hereinbefore explained and shown in Fig. 2; but the moment that an alternating, pulsating, or intermittent current does pass through the coils A A' a magnetic field is produced whose polarity is opposite to that of the adjacent pole or poles of the shunt-coil S, which immediately causes the cylinder to rotate, said rotation responding to either an increase or decrease in the current of the series coils A and A' or shunt-coil S, or both simultaneously. So in this and other well understood ways it can be made to integrate and record the total amount or part thereof in a given time of electrical energy consumed in an alternating, pulsating, or intermittent current-circuit of varying potential and constant current, or of constant potential and varying current. In series with the shunt-coil S is shown a resistance V, preferably of a non-inductive character.

By means of the lever-arm marked E the position or angle of the coil S is regulated until the desired speed is obtained.

It will be seen from the above description that the motive device of my improved meter is a transformer with a revolving secondary. Hence I give it the name of a "transformer-motor meter." It adds to the mechanical energy of the motive device to use cores of laminated iron in the primary coils A and A', as shown in Fig. 1; but the counter electromotive force generated by the iron core occasions some drop in the current, and where it is desired to avoid that the better form is to omit the iron cores, using inducing-coils without cores and a path-diverter consisting of a few light strips of soft iron. In that case it is preferable to make the primary coils large enough to envelop the armature, as is shown in Figs. 4 and 5.

What I claim, therefore, and desire to secure by Letters Patent, is—

1. In an alternating-current meter and in combination a coil or coils traversed by the current to be measured a revolving secondary cutting the field or fields of force generated by such coil or coils in its revolution a magnetic path-diverter a retarding device and a registering-train.

2. In combination with the revolving secondary of an alternating-current transformer-motor meter a coil or coils traversed by the current to be measured and generating a field or fields of force repelling said secondary a damping or retarding device driven by said revolving secondary a registering or recording device operated by said revolving secondary and an adjustable magnetic path-diverter operating to conduct the magnetic flux through the revolving secondary and so control the direction and energy of its movement.

3. In combination with the revolving secondary of an alternating-current transformer-motor meter a primary inducing coil or coils traversed by the current to be measured and generating a field or fields of force repelling said secondary a recording or registering train operated by said secondary a damping or retarding device driven by said secondary and a magnetic path-diverter inclosed in a shunt-coil connected across the terminals of the circuit whose electromotive force is one of the factors to be measured.

4. In combination with the revolving secondary of an alternating-current transformer-motor meter a shunt-wound path-diverter connected across the terminals of the meter.

Signed by me this 16th day of December, 1891.

THOMAS DUNCAN.

Witnesses:
THOMAS BAXTER,
HENRY R. WOLFE.